United States Patent
Ashok

(10) Patent No.: US 10,846,317 B2
(45) Date of Patent: Nov. 24, 2020

(54) METHOD AND SYSTEM FOR DATA PROCESSING AND STRUCTURAL CATEGORIZING

(71) Applicant: SAP SE, Walldorf (DE)

(72) Inventor: Amruth Kumar Ashok, Bangalore (IN)

(73) Assignee: SAP SE, Walldorf (DE)

( * ) Notice: Subject to any disclaimer, the term of this patent is extended or adjusted under 35 U.S.C. 154(b) by 351 days.

(21) Appl. No.: 15/358,695

(22) Filed: Nov. 22, 2016

(65) Prior Publication Data
US 2018/0143745 A1 May 24, 2018

(51) Int. Cl.
G06F 16/332 (2019.01)
G06F 16/28 (2019.01)
G06F 40/174 (2020.01)

(52) U.S. Cl.
CPC ........ G06F 16/3325 (2019.01); G06F 16/285 (2019.01); G06F 16/3323 (2019.01); G06F 40/174 (2020.01)

(58) Field of Classification Search
CPC ............. G06F 17/30598; G06F 17/243; G06F 16/3325; G06F 16/3323; G06F 16/285; G06F 40/174
See application file for complete search history.

(56) References Cited

U.S. PATENT DOCUMENTS

| | | | |
|---|---|---|---|
| 7,343,551 B1 * | 3/2008 | Bourdev | G06F 40/174 715/224 |
| 8,645,825 B1 * | 2/2014 | Cornea | G06F 40/232 715/257 |
| 9,031,970 B1 * | 5/2015 | Das | G06F 16/3322 707/767 |
| 2005/0234959 A1 * | 10/2005 | Ronnewinkel | G06Q 10/10 |
| 2006/0218088 A1 * | 9/2006 | Flora | G06Q 20/10 705/39 |
| 2006/0224558 A1 * | 10/2006 | Flora | G06Q 30/04 |
| 2012/0166929 A1 * | 6/2012 | Henderson | G06F 40/174 715/224 |
| 2012/0265787 A1 * | 10/2012 | Hsu | G06F 16/3322 707/780 |
| 2016/0092598 A1 * | 3/2016 | Mishra | G06F 16/90328 707/740 |

* cited by examiner

*Primary Examiner* — Justin R. Blaufeld
(74) *Attorney, Agent, or Firm* — Buckley, Maschoff & Talwalkar LLC

(57) ABSTRACT

A method and system including a display; a memory storing processor-executable process steps; and a processor to execute the processor-executable process steps to cause the system to: present a user interface on a display, the user interface including one or more user-entry fields to receive data categorizing an object; receive data in one or more of the displayed user-entry fields; in response to the received data, display a list of one or more pre-defined categories when the received data is not a pre-defined category; and receive a selection of the one or more pre-defined categories, linking the received data to the selected pre-defined category. Numerous other aspects are provided.

21 Claims, 12 Drawing Sheets

FIG. 4

Employee Name: Smith, John
Employee ID: 952-87-4139
Date of Hire: 13 October 2016
Function: Developer Skill 1: JAVA
Skill 2: JavaScript
Skill 3: ABAP on HANA Submit

FIG. 5

| PRE-DEFINED CATEGORY | FREE-FORM TEXT |
|---|---|
| JAVA | JAVA 8 |
| JavaScript | |
| ABAP | ABAP on HANA |
| C++ | |

FIG. 10

METHOD AND SYSTEM FOR DATA PROCESSING AND STRUCTURAL CATEGORIZING

BACKGROUND

Enterprises typically use software applications and application-related services. An enterprise application may allow an end user to categorize data into a pre-defined category, and then run analytics on the categorized data. A conventional approach may be for an end-user to categorize Person A and Person B into the pre-defined category of "Developers". This conventional approach may restrict the end-user to the pre-defined categories and may not allow the end user to categorize the data to further distinguish Person A from Person B at a more granular level that may be more appropriate for the end-user's needs.

Systems and methods are desired which support customizable categorization of data for searching and analyzing.

BRIEF DESCRIPTION OF THE DRAWINGS

Figure 4:
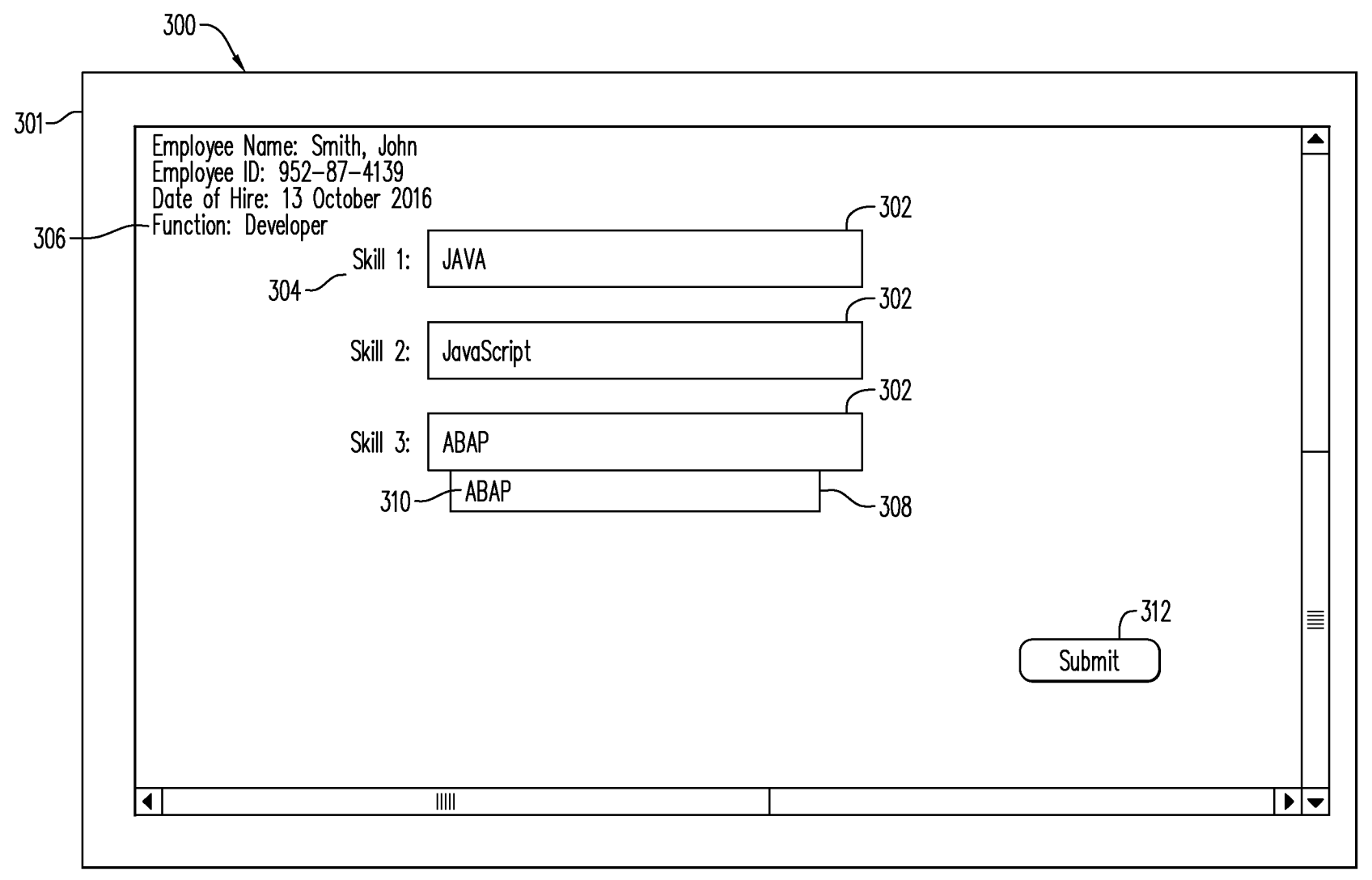

FIG. 4 is an outward view of a graphical interface according to some embodiments.

FIG. 5 is an outward view of a graphical interface according to some embodiments.

FIG. 10 is a database table according to some embodiments.

DETAILED DESCRIPTION

Figure 1:
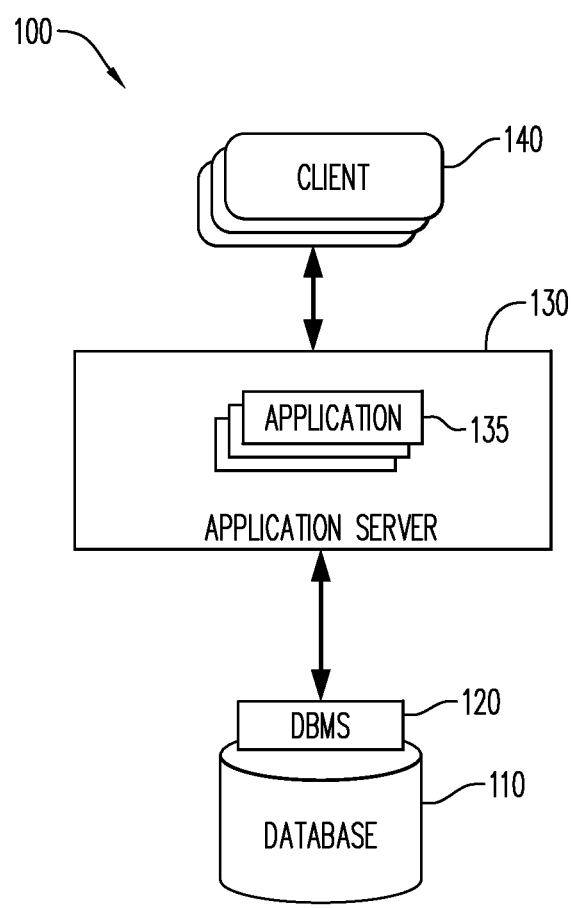
FIG. 1 is a block diagram of a system architecture according to some embodiments.
Figure 2:
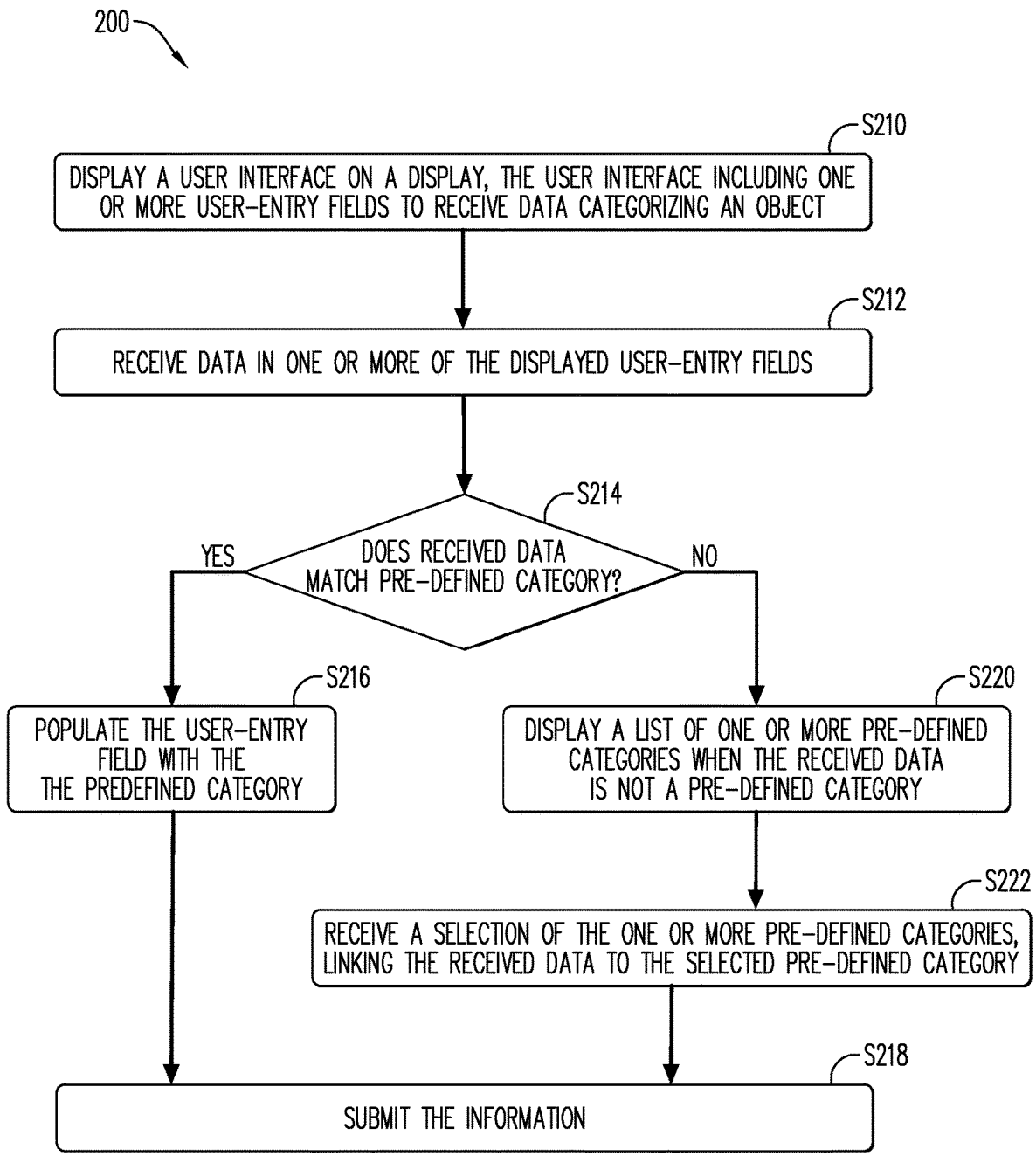
FIG. 2 is a flow diagram of a process according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Enterprises typically use software applications and application-related services. An enterprise application may allow an end user to categorize data into a pre-defined category, and then run analytics based on the pre-defined category. A conventional approach may be for an end-user to categorize Person A and Person B into the pre-defined category of "Developers". This conventional approach may restrict the end-user to the pre-defined categories. This restriction may not allow the end user to categorize the data to further distinguish Person A from Person B at a more granular level that may be more appropriate for the end-user's needs (e.g., running analytics, searches). For example, the end-user may want to further categorize Person A as a "Back-end Developer" and Person B as a "Front-end Developer." However, allowing every user to categorize the data in their own way may create too many categories on which to run effective analytics. Also, the users generally want to further define the pre-defined category into their own sub-categories, such that allowing the user to categorize the data in their own way results in categories that mean the same thing or are subsets or supersets of one another, making it difficult to run effective analytics.

In another conventional approach, the application may allow the end-user to tag the data with a free-form text entry. However, conventional tagging is specific to the data it is associated with, and is discrete, such that conventional tagging may not support effective analytics on any data other than the individually tagged data, as each data element may be tagged with different text.

Some embodiments may include an application ("app"). As used herein, the term "app" refers to a self-contained program or piece of software designed to fulfill a particular purpose.

In one or more embodiments, an application provides an end-user with the ability to categorize a data element with free-form text, and link the free-form text to a pre-defined category. In one or more embodiments, a search may be executed, and analytics run, based on at least one of the free-form text entry (child member) and the pre-defined category. Embodiments provide the end-user with the freedom to categorize an object at a more granular level than provided by pre-defined categories, while also affording the end-user the ability to execute an analytic on both the more granular user-defined category (e.g., child member) and the broader or global pre-defined category (e.g., parent category), thereby providing a more efficient analytic and a better overview over the pre-defined categories during analytics. The inventor notes that embodiments also provide for more powerful and enhanced category-based searches on data when more granular categories are assigned to the data by the user.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135 and clients 140. Applications 135 may comprise server-side executable program code (e.g., compiled code, scripts, etc.) executing within application server 130 to receive queries from clients 140 and provide results to clients 140 based on data of database 110. One such application 135 may comprise a personnel categorization application. Applications 135 executing within application server 130 may also provide user interfaces to an end user to facilitate the creation and application of local categories as described herein. These local categories may be used by the aforementioned personnel categorization application to present data to clients 140.

Application server 130 provides any suitable interfaces through which clients 140 (e.g., end user) may communicate with applications 135 executing on application server 130. For example, application server 130 may include a Hyper-Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the personnel categorization example, database 110 may store personnel function information (e.g., developer, administrator, etc.), skill information (e.g., code in JAVA, Python, works with PeopleSoft®), employee information (e.g., home address, e-mail address, education), a link between a free-form text entry and any of the other stored information (e.g., a link between function information: "developer" and free-form text entry "front-end," and/or any other data for providing a personnel categorization application. The inventor notes that while the example provided herein relates to personnel data, embodiments are applicable to any type of data that may be categorized (e.g., the object to be categorized may be a toy that may be associated with pre-defined colors including red, yellow and blue; while a free-form text entry may add the color magenta).

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 140 may comprise one or more individuals or devices executing program code of a software application for presenting user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

FIGS. 2-8 include a flow diagram of process 200 (FIG. 2) described with respect to an outward view of user interface 300/700/800 according to some embodiments. Process 200 may be executed by application server 130 according to some embodiments, e.g., by execution of the personnel categorization app 135 to provide a user with access to the user interface 300/700/800. In one or more embodiments, the application server 130 may be conditioned to perform the process 200, such that a processor 910 (FIG. 9) of the server 130 is a special purpose element configured to perform operations not performable by a general purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300/700/800 may be presented on any type of display apparatus (e.g., desktop monitor, smartphone display, tablet display) provided by any type of client device (e.g., desktop system, smartphone, tablet computer). The application which is executed to provide user interface 300/700/800 may comprise a Web Browser, a standalone application, or any other application. Embodiments are not limited to user interface 300 of FIGS. 3-6B, user interface 700 of FIGS. 7A and 7B or user interface 800 of FIG. 8.

As used herein, the term "smartphone" refers to any cellular phone that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets may typically come loaded with a web browser and a variety of applications ("apps").

Process 200 will be described with respect to FIGS. 2-8 per a fictional enterprise application related to personnel categorization.

Figure 3:
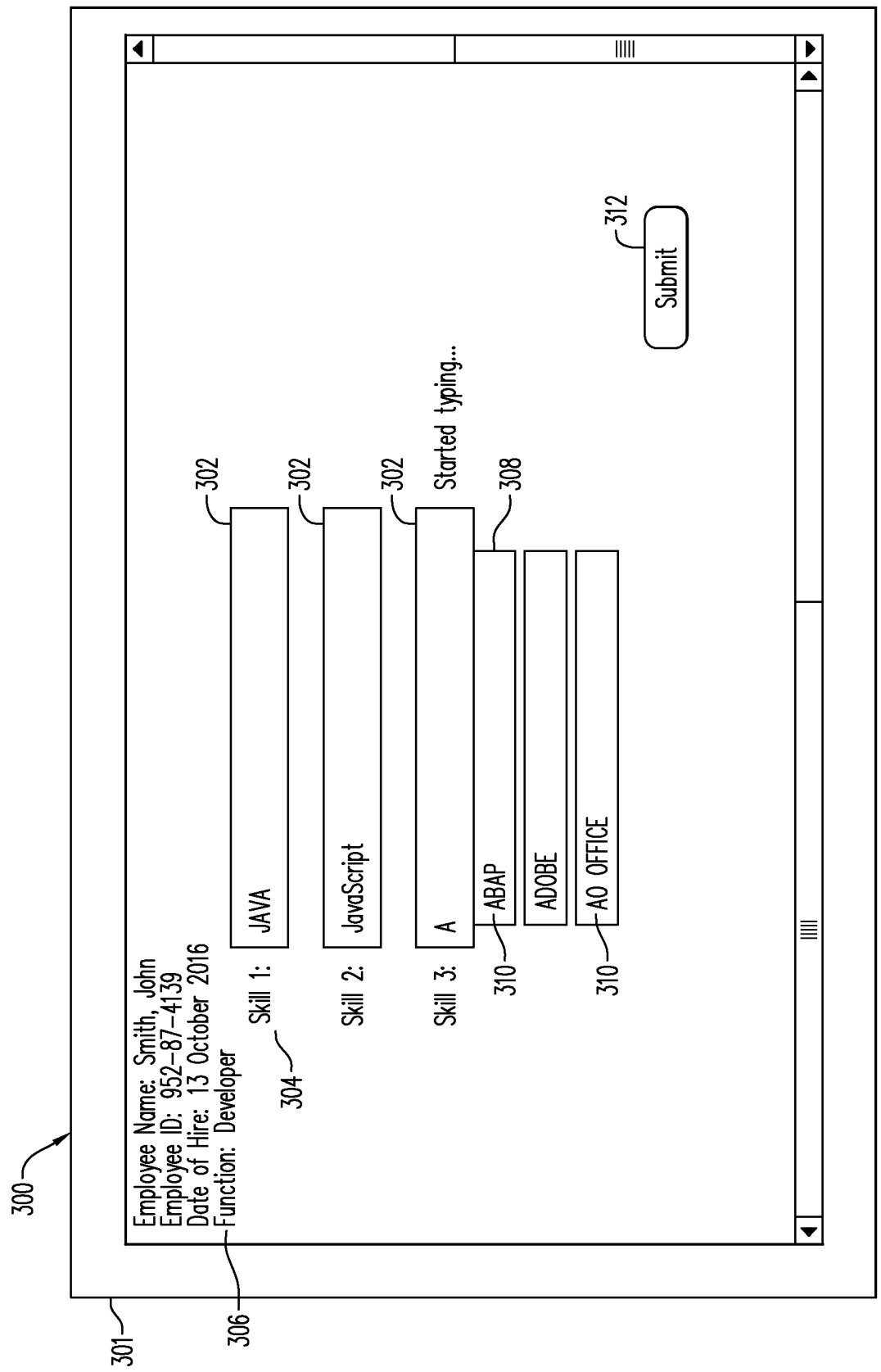
FIG. 3 is an outward view of a graphical interface according to some embodiments.

An enterprise may provide a personnel application for use by its employees across at least some portion of its enterprise. The application may be built or designed to suit the needs of the enterprise. When an end-user logs-in and opens the personnel application, user interface 300 may be presented on a display 301 with a plurality of user-entry fields 302. The personnel application may include one or more pages to enter information about a member of the personnel ("employee"). The display 301 in FIG. 3 includes user-entry fields 302 related to an employee's skills. Other suitable pages may be used (e.g., school information, contact information, employment history, etc.). Initially, at S210, the user interface 300 is displayed on the display 301, and the user interface 300 including one or more user-entry fields 302 to receive data categorizing an object 304. In the example shown in FIG. 3, the object 304 is "skill," and the received data describes the skill. In the example shown in FIG. 3, the employee's function 306 is listed as "developer," and one or more skills or objects 304 associated with the developer function 306 may be the computer languages in which they can code (e.g., JAVA, JavaScript). In FIG. 3, the data has already been entered for two of the objects (JAVA and JavaScript).

In S212, data is received in one of the displayed user-entry fields 302. In embodiments, entry of a character in the user-entry field 302 may result in a drop-down display 308 of options to categorize the object 304. The options may include one or more already existing pre-defined categories 310. In one or more embodiments, the pre-defined categories 310 may be designed or created by a programmer or administrator during set-up of the application and stored in metadata in database 110, for example. While a drop-down display 308 is shown herein, the pre-defined categories 310 may be provided alternatively (e.g., in another screen, etc.)

In the example described herein, the end-user begins to input data into the user-entry field 302. The user-entry field receives an "A," causing generation of drop-down display 308 including pre-defined categories 310 beginning with the letter "A" (e.g., ABAP, Adobe, AO Office).

If the drop-down display 308 does not include a pre-defined category the end-user wants, the end-user may continue to type the free-form text entry. In one or more embodiments, the pre-defined category 310 may be similar to what the end-user wants, but may not exactly match. In that instance, the end-user may continue to input the desired free-form text entry or may select the pre-defined category and then further input free-form text. In one or more embodiments, the user-entry field 302 may be a free-form text entry field. As used herein, a free-form text entry field permits the user to enter unstructured text (e.g., the user may enter their own text). In the example described herein, the end-user selects ABAP from the drop-down display 308 (FIG. 4), and continues to input data to customize the entry in the user-entry field 302 to be ABAP on HANA (FIG. 5).

Returning to process 200, in S214, the system 100 determines whether the data received in the user-entry field 302 matches a pre-defined category 310. If the received data matches the pre-defined category 310 in S214, the process 200 proceeds to S216 and the user-entry field 302 is populated with the pre-defined category 310. After completing entry in the user-entry field 302, the end-user submits the data via selection of a submit control 312 in S218, and the information is stored in memory 1030. In some embodiments, selection of the submit control 312 may cease an opportunity to alter the information in the user-entry field 302.

While the display 301 shown herein includes three user-entry fields 302, any suitable number of fields may be used. In some embodiments, end-users may be provided with the option to add more user-entry fields 302, via selection of an icon or some other selector, for example.

Figure 6A:
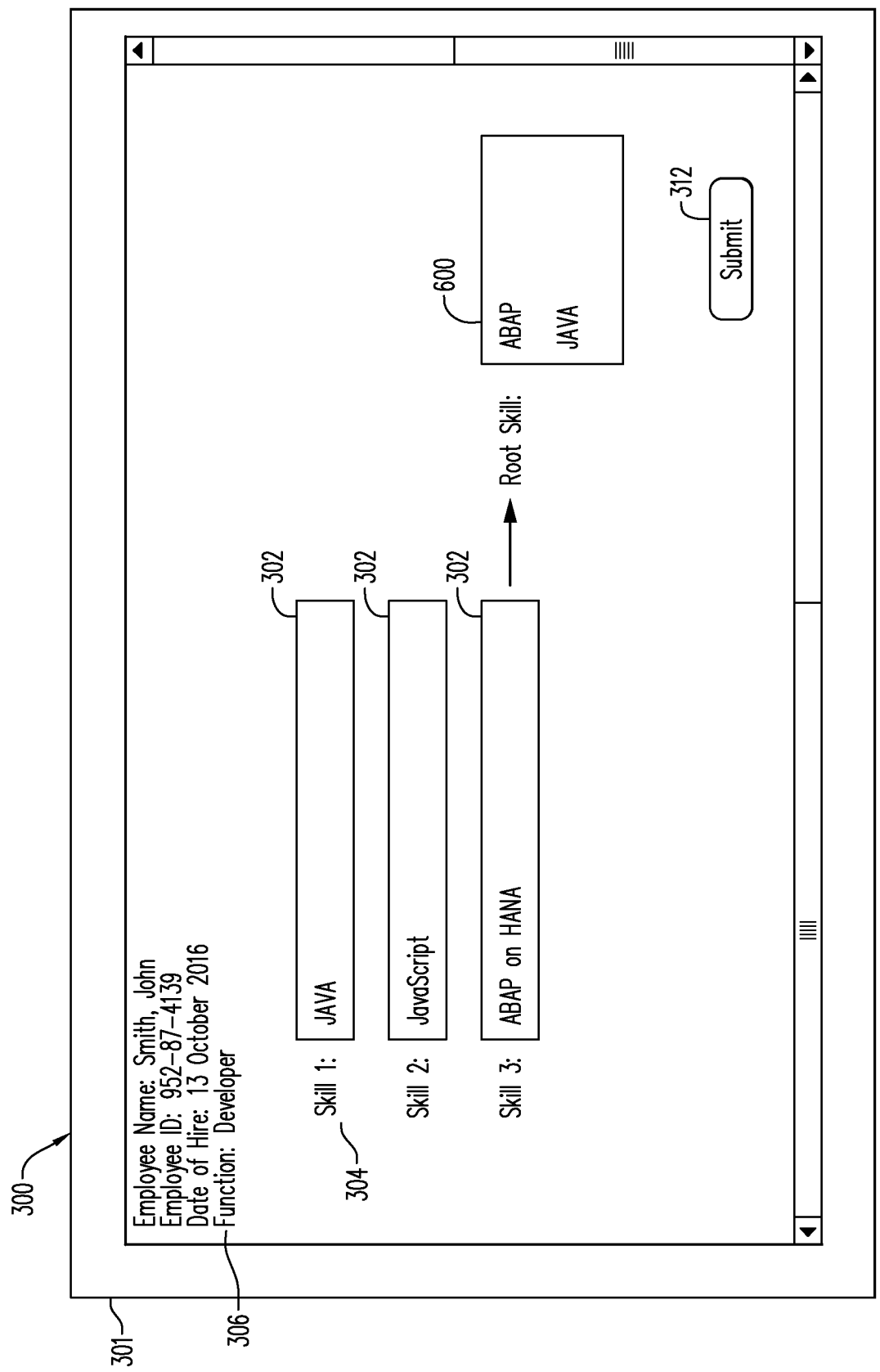
FIG. 6A is an outward view of a graphical interface according to some embodiments.
Figure 6B:
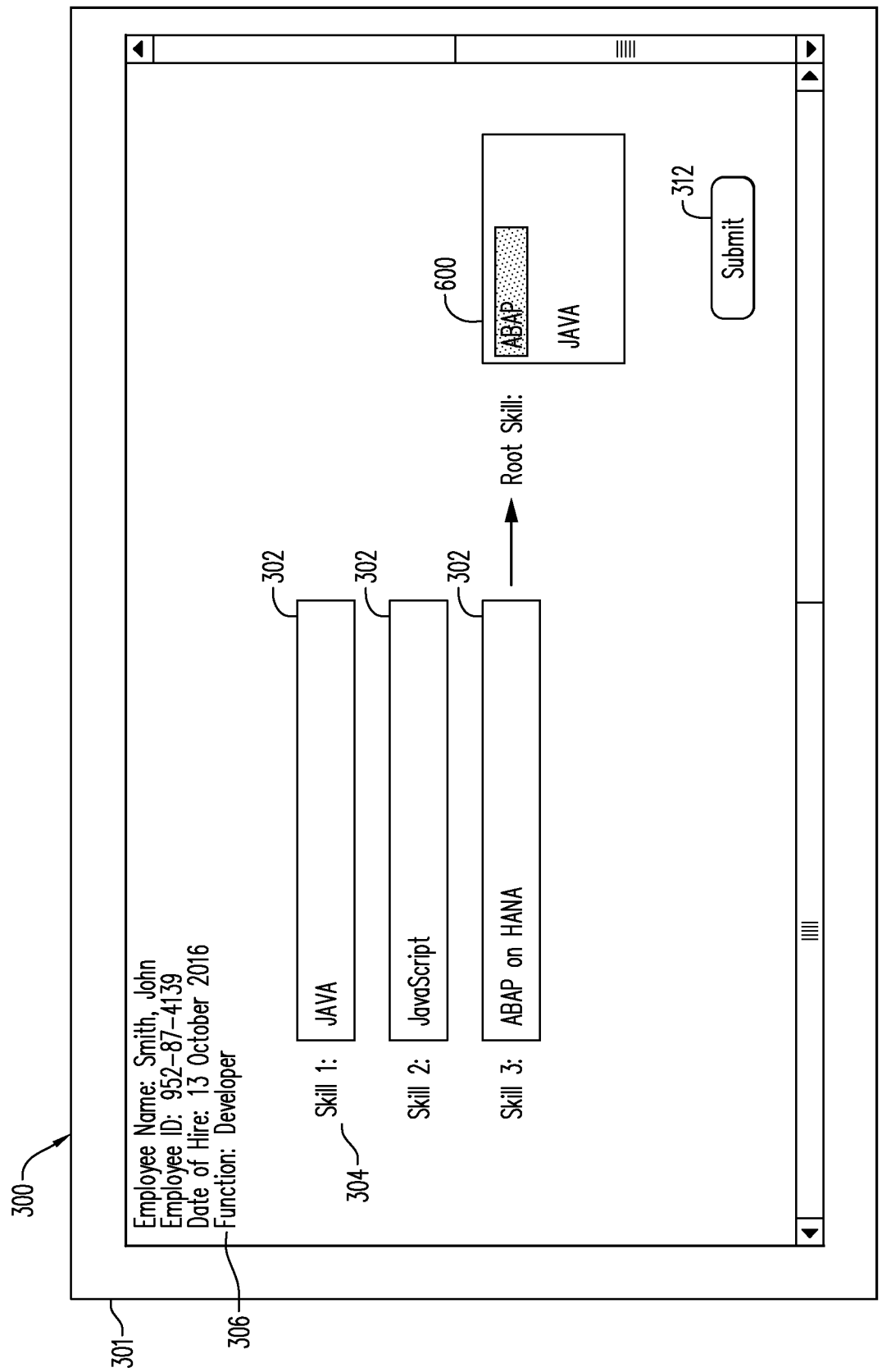
FIG. 6B is an outward view of a graphical interface according to some embodiments.
Figure 9:
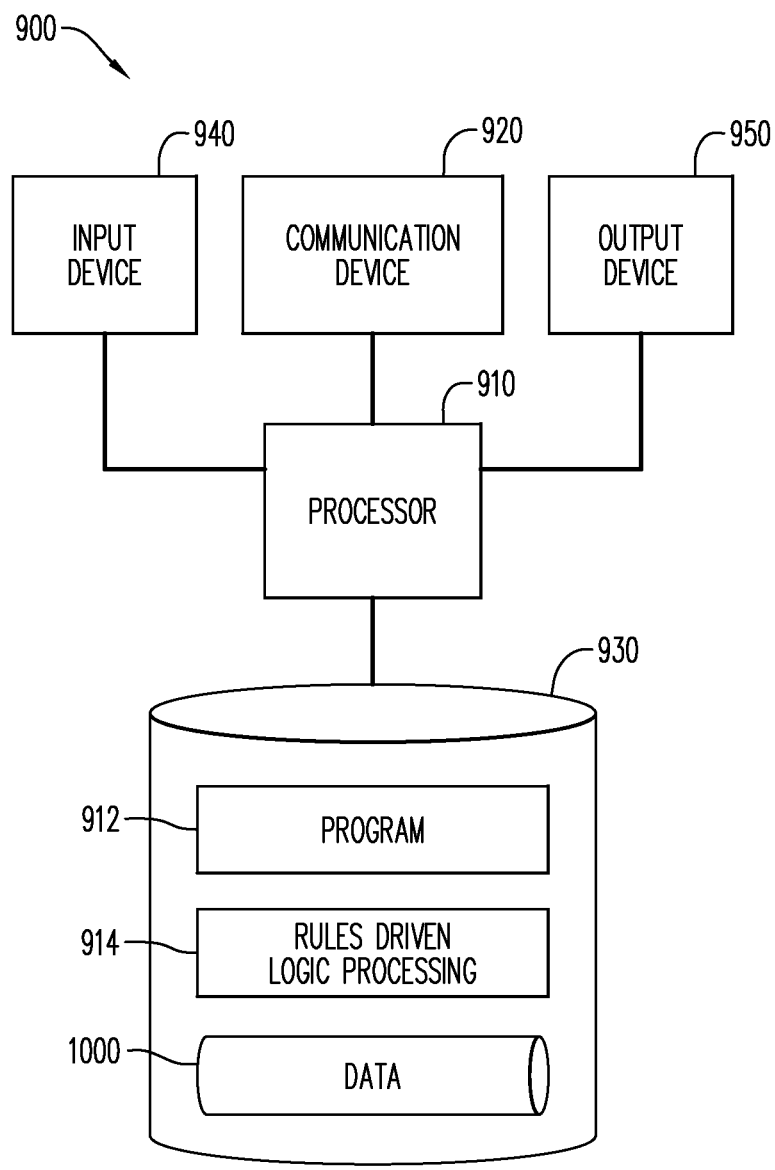
FIG. 9 is a block diagram of a system according to some embodiments.

If the received data does not match the pre-defined category 310 in S214, the process 200 proceeds to S220, and a list 600 of one or more pre-defined categories (FIG. 6A) is displayed. Then in S222 the system 100 receives a selection of the one or more pre-defined categories in the list 600 (FIG. 6B). In one or more embodiments, the pre-defined categories in the list 600 may be referred to as a "root" or global aspect to which the free-form text entry may be linked and the free-form text entry may be considered a sub-set or child thereof. While FIG. 6B shows selection of the pre-defined category ABAP from the list 600 via highlighting, any suitable selection-means may be used (e.g., highlighting, check-box, etc.). In one or more embodiments, selection of the pre-defined category 302 from the list 600, may link the free-form text in the user-entry field 302 to the pre-defined category 310. In one or more embodiments, the free-form text may be linked to the pre-defined category 310 in database 1000 (FIG. 9).

Then the end-user submits the data via selection of the submit control 312 in S218, and the information is stored in memory 930.

After the end-user has submitted the data in S218, the end-user (or any other end-user) may execute an analytic 700 (FIG. 7A) based on the submitted data. In one or more embodiments, the analytic 700 may be executed based on at least one of the free-form text data and the pre-defined categories. The analytic 700 may be presented on a display 701 with selectable free-form text categories 702 and pre-defined categories 704. After the end-user selects the categories on which to run the analytic, the results 706 may be generated (FIG. 7B).

Figure 7A:
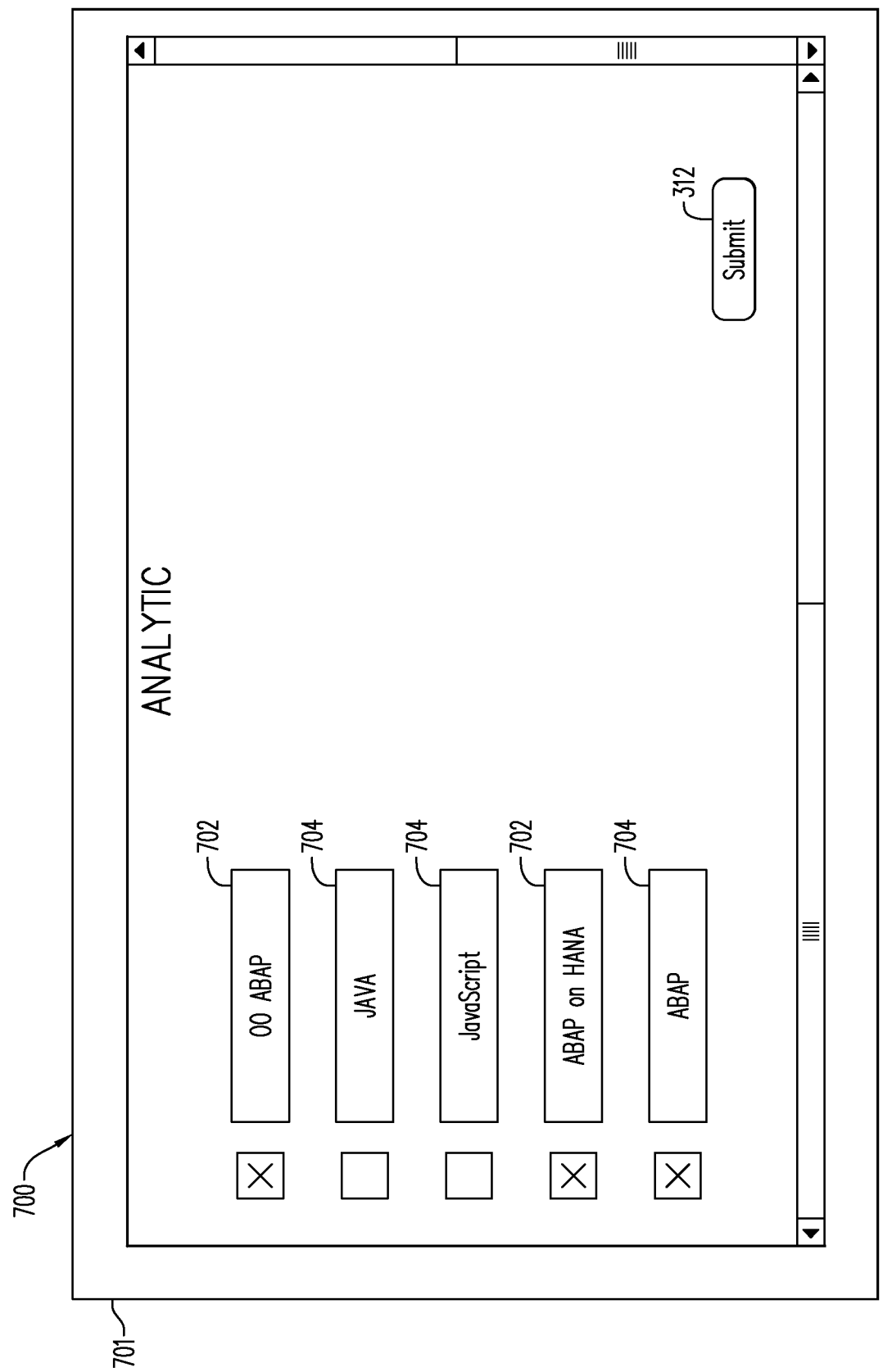
FIG. 7A is an outward view of a graphical interface according to some embodiments.
Figure 7B:
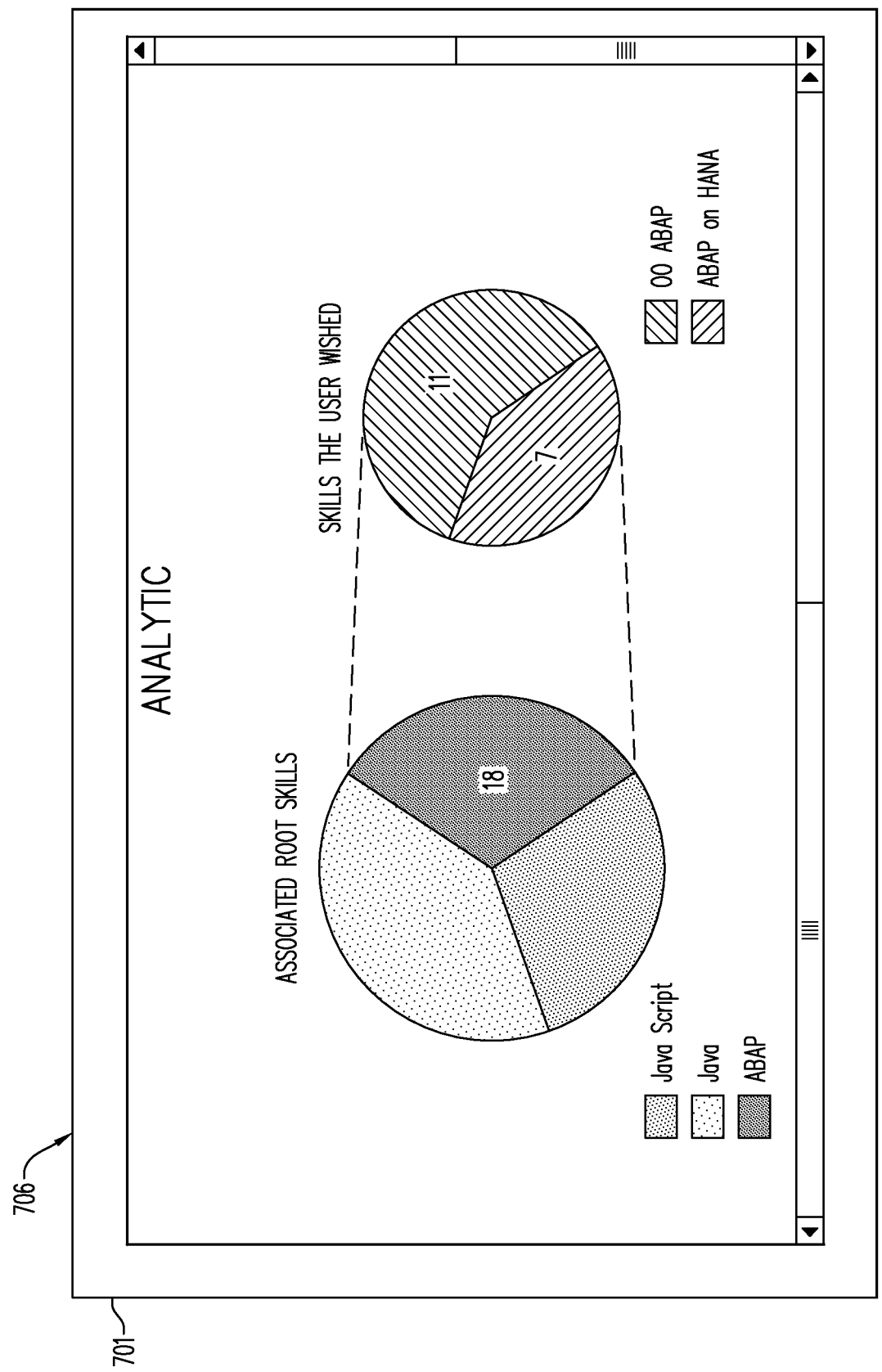
FIG. 7B is an outward view of a graphical interface according to some embodiments.
Figure 8:
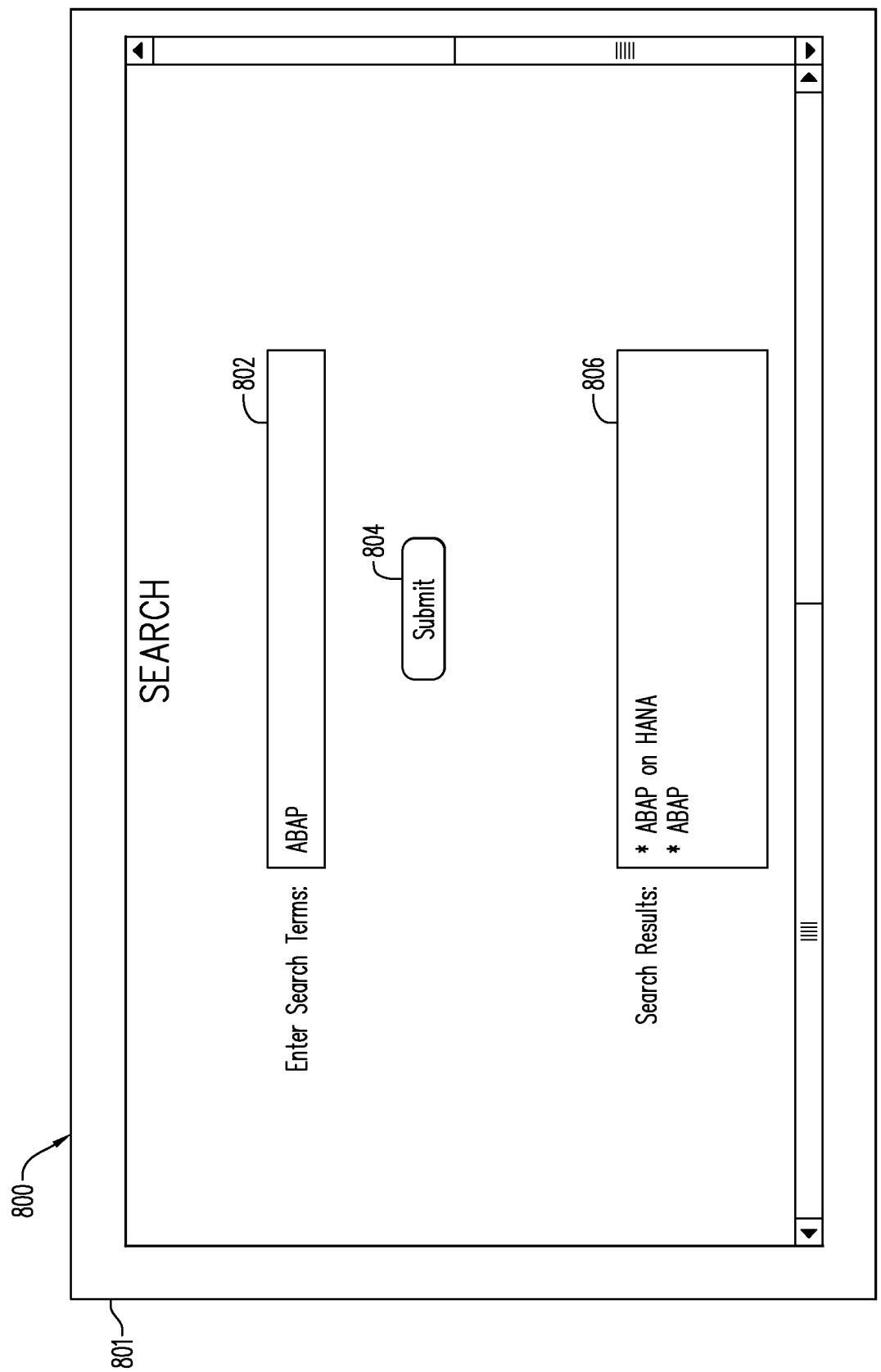
FIG. 8 is an outward view of a graphical interface according to some embodiments.

As shown in FIG. 7A, the end-user selects to run an analytic on pre-defined category ABAP 704, free-form text category OO ABAP 702 and free-form text category ABAP on HANA 702. As show in the results from execution of the analytic in FIG. 7B, 18 people have a skill of ABAP, which may be further granularized to indicate that 11 of the 18 people have the skill of OO ABAP and 7 of the 18 people have the skill of ABAP on HANA. As described above, benefits of embodiments include improving granularity of categorizing data and multilevel reporting on the categorized data.

After the end-user has submitted the data in S218, the end-user (or any other end-user) may execute a search 800 (FIG. 8) based on the submitted data. For example, the end-user may enter one or more search terms in the user-entry search field 802, and select the submit control 804. The results 806 may be provided on the same screen, or in a different screen, and may include any data stored in the database 930 including the search term "ABAP." For example, in FIG. 8, submitting the search term "ABAP", generates results 806 including "ABAP on HANA" and "ABAP." As described above, benefits of embodiments include searches that consider both child and parent level categorizing, such that the user is able to search and find the data on a more granular level and in a more user-friendly way.

FIG. 9 is a block diagram of apparatus 900 according to some embodiments.

Apparatus 900 may comprise a general- or special-purpose computing apparatus and may execute program code to perform any of the functions described herein. Apparatus 900 may comprise an implementation of one or more elements of system 100. Apparatus 900 may include other unshown elements according to some embodiments.

Apparatus 900 includes categorization processor 910 operatively coupled to communication device 920, data storage device 930, one or more input devices 940, one or more output devices 950 and memory 960. Communication device 920 may facilitate communication with external devices, such as application server 130. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to manipulate graphical user interfaces and to input information into apparatus 900. Output device(s) 950 may comprise, for example, a display (e.g., a display screen) a speaker, and/or a printer.

Data storage device/memory 930 may comprise any device, including combinations of magnetic storage devices (e.g., magnetic tape, hard disk drives and flash memory), optical storage devices, Read Only Memory (ROM) devices, Random Access Memory (RAM) etc.

The storage device 930 stores a program 912 and/or categorization platform logic 914 for controlling the processor 910. The processor 910 performs instructions of the programs 912, 914, and thereby operates in accordance with any of the embodiments described herein, including but not limited to process 200.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

In some embodiments (such as the one shown in FIG. 9), the storage device 930 further stores a personnel database 1000. An example of a database that may be used in connection with the categorization apparatus 900 will now be described in detail with respect to FIG. 10. Note that the database described herein is only one example, and additional and/or different information may be stored therein. Moreover, various databases might be split or combined in accordance with any of the embodiments described herein.

Referring to FIG. 10, a table is shown that represents the personnel database table 1000 that may be stored at the categorization apparatus 900 according to some embodiments. The table may include, for example, entries identifying skills associated with personnel members in an enterprise. The table may also define fields 1002 and 1004 for each of the entries. The fields 1002 and 1004 may, according to some embodiments, specify: a pre-defined category 1002 and free-form text 1004. The personnel database 1000 may be created and updated, for example, when an end-user enters free-from text in a user-entry field 302.

The pre-defined category data 1002 might identify skill categories that may be attributed to a personnel member of the enterprise. The free-form text data 1004 might indicate any user-entered text describing a skill attributed to the personnel member of the enterprise that is not exactly listed in the pre-defined category data.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
a display;
a memory storing processor-executable process steps; and
a processor to execute the processor-executable process steps to cause the system to:
present a user interface on a display, the user interface including one or more user-entry fields to receive data categorizing an object;
receive data in one or more of the displayed user-entry fields;
display a first list of one or more pre-defined categories while receiving the data;

remove the first list of one or more pre-defined categories when none of the pre-defined categories include all of the received data;

in response to the received data, display a second list of one or more pre-defined categories when the received data is not a pre-defined category in the first list, wherein the one or more pre-defined categories in the second list are stored in a datastore prior to presentation of the user interface on the display; and receive a selection of the one or more pre-defined categories from the second list, linking the received data to the selected pre-defined category from the second list in a database, while the received data that is not a pre-defined category in the first list persists on the user interface.

2. The system of claim 1, wherein the received data is text entered by a user, and wherein the processor further executes the processor-executable process steps to cause the system to:

determine if the text entered by the user matches the pre-defined category in the first list of one or more pre-defined categories.

3. The system of claim 2, wherein the processor further executes the processor-executable process steps to cause the system to:

generate one or more pre-defined categories to populate the user-entry field based on the determined match between the text entered by a user and the pre-defined category.

4. The system of claim 1, wherein the received data is a child member of the selected pre-defined category from the second list.

5. The system of claim 4, wherein the processor further executes the processor-executable process steps to cause the system to:

execute an analytic based on one of the child member and the selected pre-defined category from the second list.

6. The system of claim 4, wherein the processor further executes the processor-executable process steps to cause the system to:

execute a search based on one of the received data and the selected pre-defined category from the second list.

7. The system of claim 1, wherein the received data is free-form text.

8. The system of claim 1, wherein the user interface further comprises:

a submit control, wherein selection of the submit control completes the linkage of the received data to the selected pre-defined category.

9. The system of claim 1, wherein each of the one or more user-entry fields is operative to receive one of a user entered text and a selection of an item from a pre-populated list.

10. A computer-implemented method comprising:

presenting a user interface on a display, the user interface including one or more user-entry fields to receive data categorizing an object;

receiving data in one or more of the displayed user-entry fields;

displaying a first list of one or more pre-defined categories while receiving the data, wherein the received data includes: 1 data that is included in the one or more pre-defined categories of the first list, and 2 data that is not included in the one or more pre-defined categories of the first list;

determining none of the pre-defined categories in the displayed first list include all of the received data;

removing the first list of one or more pre-defined categories when none of the pre-defined categories include all of the received data;

in response to the received data, displaying a second list of one or more pre-defined categories when the received data is not a pre-defined category in the first list, wherein the one or more pre-defined categories in the second list are stored in a datastore prior to presentation of the user interface on the display; and receiving a selection of the one or more pre-defined categories from the second list, linking the received data to the selected pre-defined category from the second list in a database, while the received data that is not a pre-defined category in the first list persists on the user interface.

11. The method of claim 10, wherein the received data is text entered by a user, and further comprising:

determining whether the text entered by the user matches the pre-defined category in the first list.

12. The method of claim 11, further comprising:

generating one or more pre-defined categories to populate the user-entry field based on the determined match between the text entered by a user and the pre-defined category.

13. The method of claim 10, wherein the received data is a child member of the selected pre-defined category from the second list.

14. The method of claim 13, further comprising:

executing an analytic based on one of the child member and the selected pre-defined category from the second list.

15. The method of claim 13, further comprising:

executing a search based on one of the received data and the selected pre-defined category from the second list.

16. The method of claim 10, wherein the received data is free-form text.

17. The method of claim 10, wherein receiving data in the one or more user-entry fields further comprises:

receiving one of a user entered text and a selection of an item from a pre-populated list.

18. A non-transitory computer-readable medium storing program code, the program code executable by a computer system to cause the computer system to:

present a user interface on a display, the user interface including one or more user-entry fields to receive data categorizing an object;

receive data in one or more of the displayed user-entry fields;

display a first list of one or more pre-defined categories while receiving the data;

remove the first list of one or more pre-defined categories when none of the pre-defined categories include all of the received data;

in response to the received data, display a second list of one or more pre-defined categories when the received data is not a pre-defined category in the first list, wherein the one or more pre-defined categories in the second list are stored in a datastore prior to presentation of the user interface on the display; and receive a selection of the one or more pre-defined categories from the second list, linking the received data to the selected pre-defined category from the second list in a database, while the received data that is not a pre-defined category in the first list persists on the user interface.

19. The medium of claim 18, wherein the received data is a child member of the selected pre-defined category from the second list.

20. The medium of claim 19, wherein the program code is further executable by the computer system to cause the computer system to:
    execute an analytic based on one of the child member and the selected pre-defined category from the second list.

21. The medium of claim 19, wherein the program code is further executable by the computer system to cause the computer system to:
    execute a search based on one of the received data and the selected pre-defined category from the second list.

* * * * *